United States Patent [19]

Arashiro et al.

[11] Patent Number: 5,091,473

[45] Date of Patent: Feb. 25, 1992

[54] RESIN COMPOSITION

[75] Inventors: Yusuke Arashiro; Shinichi Yamauchi; Hironari Sano; Takayuki Inoue; Koji Nishida, all of Yokkaichi, Japan

[73] Assignee: Mitsubishi Petrochemical Co., Ltd., Tokyo, Japan

[21] Appl. No.: 571,109

[22] Filed: Aug. 23, 1990

[30] Foreign Application Priority Data

Aug. 28, 1989 [JP] Japan .................................. 1-218618

[51] Int. Cl.$^5$ ...................... C08L 53/00; C08L 71/04
[52] U.S. Cl. ..................................... 525/92; 525/133; 525/397; 525/905
[58] Field of Search ........................................... 525/92

[56] References Cited

U.S. PATENT DOCUMENTS 4,628,072 12/1986 Shiraki et al. ........................... 525/57
4,772,664 9/1988 Ueda et al. .............................. 525/92

Primary Examiner—Ana L. Carrillo
Attorney, Agent, or Firm—Oblon, Spivak, McClelland, Maier & Neustadt

[57] ABSTRACT

There is disclosed a resin composition comprising:
(a) 28 to 78% by weight of a polyamide resin,
(b) 20 to 70% by weight of a polyphenylene ether resin,
(c) 2 to 40% by weight of a block copolymer composed of an alkenyl aromatic polymer and a conjugated diene polymer wherein a content of an alkenyl aromatic polymer structure unit is 10 to 45% by weight and at least 50% of a conjugated diene polymer structure unit is hydrogenated and
(d) at least one compound selected from the group consisting of $\alpha,\beta$-unsaturated dicarboxylic acid, an acid anhydride and derivatives thereof with an amount of 0.01 to 10 parts by weight based on 100 parts by weight of the sum of Components (a), (b) and (c), which has a specific dispersion state.

The resin composition has excellent thermal stability and also good balance between impact strength, rigidity and high temperature rigidity with high degree.

7 Claims, No Drawings

RESIN COMPOSITION

BACKGROUND OF THE INVENTION

This invention relates to a resin composition comprising a polyamide resin, a polyphenylene ether resin, a block copolymer and α, β-unsaturated dicarboxylic acid or a derivative thereof, more particularly to a resin composition having excellent impact strength, and excellent balance in heat-resisting rigidity, heat-resisting aging property and molding property, and also available as a material for injection molding, extrusion molding and blow molding such as a member in the fields of automobile, electric and electronic.

Polyamide resin has widely been used as one of the representative engineering plastics excellent in heat resistance, oil resistance and molding property. However, this resin has defects that characteristics of dimensional stability, hygroscopicity, heat-resisting deformation property under high load and impact resistance are poor.

On the other hand, polyphenylene ether resin has been admitted as engineering plastics having excellent heat resistance, dimensional stability, non-hygroscopicity and electric characteristics, but there are defects that melt flowability is bad, working by molding is difficult and oil resistance and impact resistance are poor.

Thus, in order to provide a molding material without impairing merits of both materials and complementing each defects, various compositions have been proposed. For example, compositions wherein both of the resins are simply melted and mixed are disclosed in U.S. Pat. Nos. 3,379,792 and 4,338,421 and Japanese Patent Publications No. 997/1970 and No. 41663/1984. However, the polyamide resin and the polyphenylene ether resin are inherently bad in compatibility and thus, in such simple blended systems, affinity at the interface is poor and phase separation is caused at molding so that a composition excellent in mechanical strength cannot be obtained.

Accordingly, some methods for improving compatibility of the polyamide resin and the polyphenylene ether resin have been proposed. For example, a method in which a compound having a carbon-carbon double bond and a functional group such as a carboxyl group, acid anhydride group, acidamide group and imide group is added as a third component (Japanese Provisional Patent Publication No. 26913/1981), and a method in which a copolymer of styrene type compound and an α, β-unsaturated dicarboxylic acid is blended (Japanese Patent Publication No. 33614/1984). However, impact resistance is still insufficient even in these compositions, so that further improvement has been desired.

In order to improve impact resistance of a multiple-component polymer blended material such as a polyamide resin and a polyphenylene ether resin, it has been considered to mix and disperse an elastomer which is an improver for impact strength. Further, such a multiple-component material containing mutually incompatible components causes phase separation so that various characteristics have been considered to be greatly depending upon phase separation structure.

For example, there has been proposed in Japanese Provisional Patent Publication No. 27254/1987, a multiphase structural material that, in a three-component system material comprising a polyamide resin, a polyphenylene ether resin and a specific A—B—A' type diene series block copolymer, when melting viscosities of the polyamide resin and the polyphenylene ether resin satisfy specific relationship, the polyamide resin exists as a continuous phase, the polyphenylene ether resin as a primary dispersed phase and the block copolymer as further secondary dispersed phase in the primary dispersed phase. According to the detailed description of the invention of the patent, there are described that composition ratio and viscosity ratio of the polyamide resin component and the polyphenylene ether resin component are important factors and selecting these suitably, the primary dispersed phase of the polyphenylene ether resin component is controlled in a suitable particle size range whereby properties such as impact strength and rigidity can be improved. However, it cannot be said that heat-resisting aging property, impact resistance and rigidity are sufficient.

Also, in Japanese Provisional Patent Publication No. 79258/1989, there is proposed a polyphenylene ether polyamide composition in which a hydrogenated block copolymer having a content of a vinyl aromatic compound and molecular weight in specific ranges is used as a third component. There are described that when this composition forms a specific multi-phase structure, i.e. the polyamide forms a continuous phase, the polyphenylene ether component exists as a dispersed phase having a specific grain diameter size and the block copolymer is being present with the secondary dispersed state in the polyphenylene ether dispersed phase, the product shows properties excellent in balance such as heat-resisting deformation, impact resistance, oil resistance and rigidity. However, impact resistance cannot yet be said to be sufficient.

SUMMARY OF THE INVENTION

An object of the present invention is, under such a circumstance, to provide a resin composition which has characteristics of a polyamide resin and a polyphenylene resin simultaneously, i.e. excellent in heat resistance and also highly excellent balance in impact resistance, rigidity and high temperature rigidity.

In order to accomplish the above objects, the present inventors have intensively studied how to disperse a block copolymer which is an impact strength improver. As the results, they have found that only when a melt viscosity ratio of the block copolymer and the polyphenylene ether resin is present in a specific range, impact resistance is remarkably improved at which a multi-phase structure is formed, whereby accomplished the present invention.

That is, the resin composition of the present invention comprises (a) 28 to 78% by weight of a polyamide resin, (b) 20 to 70% by weight of a polyphenylene ether resin, (c) 2 to 40% by weight of a block copolymer composed of an alkenyl aromatic polymer and a conjugated diene polymer wherein a content of an alkenyl aromatic polymer structure unit is 10 to 45% by weight and at least 50% of a conjugated diene polymer structure unit is hydrogenated and (d) at least one compound selected from the group consisting of α, β-unsaturated dicarboxylic acid, an acid anhydride and derivatives thereof with an amount of 0.01 to 10 parts by weight based on 100 parts by weight of the sum of Components (a), (b) and (c), Component (b) being present in Component (a) as a primary dispersed phase, Component (c) forming a secondary dispersed phase in Component (b), an average particle size of Component (c) being in the range of 0.01 to 3 μm, and a melt viscosity ratio ($\eta_c/\eta_b$) of Component (c) and Component (b) being in the range of 0.09 to 5.

DESCRIPTION OF THE PREFERRED EMBODIMENTS

In the following, the present invention will be described in more detail.

The polyamide resin of Component (a) to be used in the present invention has a -CONH- bond in the polymer main chain and can be melted under heating. Representative examples may include polyamide-4, polyamide-6, polyamide-6,6, polyamide-4,6, polyamide-12 and polyamide-6,10, and a low crystallinity or amorphous polyamide containing monomer components such as other known aromatic diamine and aromatic dicarboxylic acid, and transparent Nylon (trade name), and mixtures thereof may be used.

The polyamide resin (a) to be preferably used in the present invention is polyamide-6,6 (polyhexamethylene adipamide), polyamide-6 (polycapramide) and amorphous polyamide.

The polyamide resin to be used in the present invention preferably has a relative viscosity (measured at 25° C., in 98% conc. sulfuric acid, according to JIS K6810 test method) of 2.0 to 8.0.

The polyphenylene ether resin of Component (b) to be used in the present invention has a structural unit represented by the following formula:

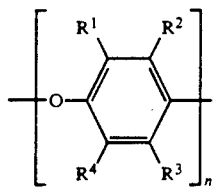

wherein the ether oxygen atom of one unit is connected to the benzene nucleus of the adjacent unit, n is at least 50, $R^1$, $R^2$, $R^3$ and $R^4$ each independently represent a monovalent group selected from the group consisting of hydrogen atom, halogen atoms, hydrocarbon groups containing no tertiary α-carbon atom, halohydrocarbon groups having at least 2 carbon atoms between halogen atom and benzene nucleus, hydrocarbonoxy groups, and halohydrocarbonoxy groups having at least 2 carbon atoms between halogen atom and benzene nucleus.

In the above formula (I), examples of the hydrocarbon groups containing no tertiary α-carbon atom represented by $R^1$, $R^2$, $R^3$ and $R^4$ may include lower alkyl groups such as methyl group, ethyl group, propyl group, isopropyl group and butyl group; alkenyl groups such as vinyl group, allyl group, butenyl group and cyclobutenyl group; aryl groups such as phenyl group, tolyl group, xylenyl group and 2,4,6-trimethylphenyl group; and aralkyl groups such as benzyl group, phenylethyl group and phenylpropyl group. Examples of halohydrocarbon groups wherein the halogen atom is substituted through at least two carbon atoms may include 2-chloroethyl group, 2-bromoethyl group, 2-fluoroethyl group, 2,2-dichloroethyl group, 2- and 3-bromopropyl groups, 2,2-difluoro-3-iodopropyl group, 2-,3-,4- and 5-fluoroamyl groups, 2-chlorovinyl group, chloroethylphenyl group, ethylchlorophenyl group, fluoroxylyl group, chloronaphthyl group and bromobenzyl group. As the hydrocarbonoxy groups, there may be included, for example, methoxy group, ethoxy group, propoxy group, butoxy group, phenoxy group, ethylphenoxy group, naphthoxy group, methylnaphthoxy group, benzoxy group, phenylethoxy group and triethoxy group. Examples of halohydrocarbonoxy groups having at least two carbon atoms between halogen atom and benzene nucleus may include 2-chloroethoxy group, 2-bromoethoxy group, 2-fluoroethoxy group, 2,2-dibromoethoxy group, 2- and 3-bromopropoxy groups, chloroethylphenoxy group, ethylchlorophenoxy group, iodoxyloxy group, chloronaphthoxy group, bromobenzoxy group and chlorotolylethoxy group.

The polyphenylene ether resin to be used in the present invention may include copolymers such as a copolymer of 2,6-dimethylphenol with 2,3,6-trimethylphenol, a copolymer of 2,6-dimethylphenol with 2,3,5,6-tetramethylphenol and a copolymer of 2,6-diethylphenol with 2,3,6-trimethylphenol. Further, the polyphenylene ether to be used in the present invention also includes modified polyphenylene ethers such as the polyphenylene ether defined by the above formula (I) having a styrenic monomer (e.g. styrene, p-methylstyrene and α-methylstyrene) grafted thereon.

The methods for preparing the polyphenylene ethers corresponding to the above have been known in the art, and disclosed in, for example, U.S. Pat. Nos. 3,306,874, 3,306,875, 3,257,357 and No. 3,257,358, and Japanese Patent Publication No. 17880/1977 and Japanese Provisional Patent Publication No. 51197/1975.

A group of polyphenylene ether resin (b) preferred for the object of the present invention is those having alkyl substituents at the two ortho-positions relative to the ether oxygen atom and a copolymer of 2,6-dialkylphenol with 2,3,6-trialkylphenol.

The polyphenylene ether resin (b) to be used in the present invention preferably has an inherent viscosity measured at 30° C. in chloroform in the range of 0.25 to 0.70 dl/g, more preferably 0.30 to 0.60 dl/g and mechanical strength and flowability itself are good.

The block copolymer (c) to be used comprises a polymer having both of an alkenyl aromatic polymer block unit and a conjugated diene polymer block unit in the same molecule and the content of the alkenyl aromatic polymer unit of 10 to 45% by weight, and at least 50% of double bonds in the conjugated diene polymer block unit are hydrogenated.

The type of the block bonding may be any type such as the diblock type, triblock type, multiblock type, tapered block type and radial tereblock type and not particularly limited, but among these, the diblock type and triblock type are particularly preferred.

Specific examples of a monomer constituting the alkenyl aromatic polymer block unit may include styrene, paramethyl styrene, α-methylstyrene, vinylxylene, vinylnaphthalene, divinylbenzene, bromostyrene and chlorostyrene, and it may be a combination thereof. Of these, styrene, α-methylstyrene, paramethyl styrene and vinylxylene are preferred, and styrene is more preferred.

If the ratio of the alkenyl aromatic polymer block unit occupied in the block copolymer exceeds 45% by weight, impact resistance is lowered, and if it is less than 10% by weight, rigidity will be lowered so that the range other than the above is not preferred.

As specific examples of a monomer constituting the conjugated diene polymer block unit, there may be included 1,3-butadiene, 2-methyl-1,3-butadiene, 2,3-dimethyl-1,3-butadiene and 1,3-pentadiene, and of these, 1,3-butadiene and 2-methyl-1,3-butadiene are preferred.

As a process for producing the alkenyl aromatic polymer-conjugated diene block copolymer, a large number of methods have been proposed. A representative method is the method as disclosed in Japanese Patent Publication No. 23798/1965, U.S. Pat. Nos. 3,595,942 and 4,090,996, in which block copolymerization is carried out in an inert solvent by use of a lithium catalyst or a Ziegler type catalyst.

Hydrogenation treatment of these block copolymers are conducted by hydrogenating the copolymers in the presence of a hydrogenation catalyst in an inert solvent according to the processes as described in, for example, Japanese Patent Publication No. 8704/1967, No. 6636/1968 or No. 20814/1971. In this hydrogenation, at least 50%, preferably 80% or more of olefinic double bonds in the conjugated diene polymer block are hydrogenated and 25% or less of the aromatic unsaturated bonds in the alkenyl aromatic polymer block may be hydrogenated. As one of such block copolymers, there is one commercially sold under trade name of "KRATON G" from Shell Chemical Co.

The viscosity ratio ($\eta_c/\eta_b$) of a melt viscosity ($\eta_c$) of the block copolymer (c) and a melt viscosity ($\eta_b$) of the polyphenylene ether resin (b) is preferably in the range of 0.09 to 5, more preferably in the range of 0.3 to 3.0 measuring at a temperature of 280° C. and a shear rate of 100 sec$^{-1}$. If the viscosity ratio is less than 0.09, the block copolymer do no disperse in the polyphenylene ether resin dispersion phase, and if it exceeds 5, dispersion particles size of the block copolymer dispersed in the polyphenylene ether resin becomes large. Also, a dispersion particle size of the block copolymer which is further dispersed in the polyphenylene ether resin dispersion layer is required to be in the range of 0.01 to 3 μm, preferably in the range of 0.1 to 3 μm, and particularly preferably in the range of 0.1 to 0.7 μm. If it is less than 0.01 μm or exceeding 3 μm, a level of impact strength becomes insufficient.

The component (d) to be used in the present invention is at least one selected from the group consisting of an α, β-unsaturated dicarboxylic acid and acid anhydride, and derivatives thereof. Specifically, there may be included maleic anhydride, maleic acid, fumaric acid, itaconic acid, maleimide, maleic hydrazide, a reaction product of maleic anhydride and a diamine, for example, those having the structures represented by the following formulae:

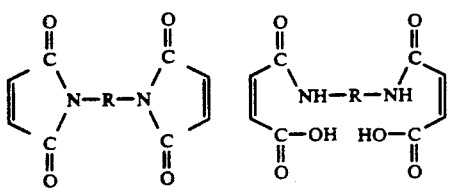

wherein R represents an aliphatic group or an aromatic group, dichloromaleic anhydride and maleic amide. Of these, maleic anhydride and a mixture of maleic anhydride and maleic acid are suitable.

COMPOSITIONAL RATIO OF THE CONSTITUENT COMPONENTS

In the resin composition of the present invention, a ratio of the polyamide resin (a) to be occupied therein is in the range of 28 to 78% by weight based on the total weight of the polyamide resin (a), the polyphenylene ether resin (b) and the block copolymer (c). In order to obtain higher mechanical properties balance, it is more preferred in the range of 35 to 75% by weight, particularly preferably 40 to 70% by weight. If it is less than 28% by weight, a level of oil resistance is low and if it exceeds 78% by weight, heat-resisting rigidity becomes insufficient.

A ratio of the polyphenylene ether resin (b) to be occupied in the resin composition of the present invention is in the range of 20 to 70% by weight based on the total weight of the polyamide resin (a), the polyphenylene ether resin (b) and the block copolymer (c). In order to obtain higher mechanical properties balance, it is more preferred in the range of 20 to 60% by weight, and particularly preferably 25 to 50% by weight. If it is less than 20% by weight, heat-resisting rigidity is insufficient and if it exceeds 70% by weight, oil resistance and impact strength become inferior.

When the polyphenylene ether resin with an intrinsic viscosity in the range of 0.3 to 0.6 dl/g generally employed in industry is used due to its good balance in mechanical strength and flowability, if a ratio thereof exceeds 50% by weight based on the total weight of the polyamide resin (a), the polyphenylene ether resin and the block copolymer (c), it becomes difficult to form a multi-phase structure wherein the polyphenylene ether resin component becomes a primary dispersion phase which is one of the characteristic features of the present invention.

A ratio of the block copolymer (c) to be occupied in the resin composition of the present invention is in the range of 2 to 40% by weight based on the total weight of the polyamide resin (a), the polyphenylene ether resin (b) and the block copolymer (c). In order to obtain higher mechanical properties balance, it is more preferred in the range of 5 to 35% by weight, and particularly preferably 7 to 30% by weight. If it is less than 2% by weight, impact strength is insufficient and if it exceeds 40% by weight, heat resistance and rigidity become low.

A ratio of the compound of α, β-unsaturated dicarboxylic acid and acid anhydride and derivatives thereof (d) to be occupied in the resin composition of the present invention is 0.01 to 10 parts by weight, preferably in the range of 0.05 to 5 parts by weight, more preferably 0.2 to 2 parts by weight based on the total 100 parts by weight of the polyamide resin (a), the polyphenylene ether resin (b) and the block copolymer (c). If it is less than 0.01 part by weight, impact resistance is insufficient and if it exceeds 10 parts by weight, difficulty would be caused at appearance of the molded product of the resin composition.

METHOD OF MIXING THE COMPOSITION

Preparation of the resin composition of the present invention can be carried out by use of any method such as the method in which the mixture is melted and kneaded by use of various kneading machines such as a single screw extruder, a twin screw extruder and Banbury mixer, the method in which after mixing solutions or suspensions of each component, removing the solvents, or the method in which a common non-solvent is added to effect precipitation and then filtered to recover a composition. Also, order of kneading may be carried out by kneading whole components simultaneously or by using previously and preliminary kneaded blend materials. Further, utilizing the difference between the melt viscosities, kneading may be carried out by feeding each component in the course of an extruder stepwise. From an economical view point, it is desired to mix all the components simultaneously. In order to improve impact strength more and more, the method in which kneading is carried out by a twin screw extruder according to the successive feeding method as mentioned below is effective. That is, by using a twin screw extruder having two inlets for fill, Component (b) of the polyphenylene ether resin, Component (c) of the block copolymer, Component (d) of the α, β-unsaturated dicarboxylic acid derivative and a part of Component (a) of the polyamide resin, i.e. not exceeding 50% by weight of the formulated amount of the polyamide resin, preferably 50% by weight or less are fed from the first inlet to effect the first step kneading. Then, the remaining polyamide resin is fed from the second inlet and kneaded to obtain the resin composition of the present invention. An amount of Component (a) to be added in the first step is preferably 30% by weight or less, more preferably 20% by weight or less, particularly preferably 5 to 20% by weight based on the total amount of Component (a) to be added. Other third additive components such as a rubber-like polymer, an inorganic filler, a pigment and a stabilizer may be fed from either one of inlets or both inlets by dividing it. The reason why such a successive feeding method is effective for improving characteristics of the resin composition is not clear but it can be considered that miscibility of the polyphenylene ether resin and the polyamide resin, and the polyphenylene ether resin and the block copolymer are further improved.

Depending on necessity for practical use, other rubber-like polymer, a glass fiber, potassium titanate whisker, an inorganic filler such as talc and calcium carbonate, a pigment, and a stabilizer may be optionally added.

The resin composition of the present invention maintains characteristics of both resins of the polyamide and the polyphenylene ether and also supplemented defects of the respective resin. Thus, it is excellent in impact strength, heat-resisting rigidity and heat-resisting aging property, and also provides a resin excellent in moldability whereby it is widely available for an industrial material.

EXAMPLES

The present invention is described by referring to Examples, but the present invention is not limited in its scope by the Examples at all.

EXAMPLES 1 to 6

Resin compositions were prepared by kneading each composition shown in Table 1 to prepare samples of Examples 1 to 6, respectively. Physical properties of these compositions were evaluated and shown in Table 1.

Kneading of the resin is carried out the respective components were thoroughly stirred and mixed by a super mixer, and then melted and kneaded by means of a PCM twin screw mixer manufactured by Ikegai Tekko K.K. at 280° C. and 350 rpm to form into a composition, which was then extruded into a strand and formed into pellets by a cutter. Since the polyamide resin has hygroscopicity, for effecting kneading and molding, drying by use of a reduced pressure dryer at the conditions of 0.1 mmHg and 80° C. for 48 hours was carried out immediately before use.

In Examples 1 to 6, resin compositions in which a block copolymer dispersed in the polyphenylene ether resin dispersion layer is ideally dispersed and which are excellent in rigidity, heat resistance and impact strength can be obtained only when the melt viscosity ratio is in the range of the present invention.

COMPARATIVE EXAMPLES 1 to 5

In the same manner as in Examples 1 to 6, compositions of Comparative examples 1 to 5 were prepared with the compositional ratio shown in Table 1. Physical properties of these compositions were also evaluated and shown in Table 1.

As the results, in Comparative examples 1 to 3, the melt viscosity ratio of which are out of the range of the present invention, levels of rigidity and impact resistance are remarkably low so that the effect of the present invention is remarkable.

In Comparative example 4, wherein a styrene content of the block copolymer is out of the range of the present invention, level of impact resistance is low.

In Comparative example 5, the same procedures are carried out as in Examples 1 to 6 except for using a styrene-butadiene-styrene copolymer (SBS) in place of the block copolymer used therein, and characteristics thereof were evaluated. In this comparative example 5, it became the composition that heat-resisting aging property is markedly lowered and thermal stability in inferior.

Each component used is as follows.

(1) Component (a): Polyamide resin

Polyamide-6 (Novamid-1040, trade name) produced by Mitsubishi Kasei Corporation was used.

(2) Component (b) Polyphenylene ether resin

Three kinds of resins of poly-2,6-dimethyl-1,4-phenylene ether produced experimentally by Mitsubishi Petrochemical Co., Ltd. having an inherent viscosity measured in chloroform and at 30° C. of 0.51 dl/g, 0.40 dl/g and 0.32 dl/g, respectively, were used.

(3) Component (c): Block copolymer

Hydrogenated styrene-butadiene copolymer (SEBS) (KRATON G-1650, trade name: styrene content of 28% by weight; KRATON G-1651, trade name: styrene content of 33% by weight; KRATON G-1652, trade name: styrene content of 29% by weight; and KRATON G-1726, trade name: styrene content of 30% by weight), and hydrogenated styrene-isoprene copolymer (KRATON GX-1701, trade name: styrene content 37% by weight) all produced by Shell Chemical Co., and as the comparative purpose, styrene-butadiene-styrene copolymer (SBS) (KALIFLEX KX-65, trade name) produced by Shell Chemical Co. were used.

Hydrogenated styrene-butadiene-styrene copolymers (Hydrogenated SBS1: styrene content of 40% by weight and Hydrogenated SBS2: styrene content of 60% by weight) with high styrene contents were used by hydrogenating a styrene-butadiene-styrene copolymer produced by Nippon Synthetic Rubber Co. in Mitsubishi Petrochemical Co., Ltd.

(4) Component (d): Maleic anhydride

Maleic anhydride (reagent grade) commercially available was used.

Evaluating methods of the respective physical property value of the samples are as shown below.

(1) Preparation of test piece for evaluation

Using an injection molding machine M40A-SJ (trade name) produced by Meiki Seisakusho K.K., a test piece was prepared by subjecting to injection molding at a cylinder temperature of 280° C. and a mold cooling temperature of 60° C. The test piece was placed in a desiccator immediately after preparation thereof, and evaluation was carried out after allowed to stand at 23° C. for 4 to 6 days.

(2) Measurement and evaluation method

1) MFR:

Melt flow rate was measured at 280° C. under a load of 5 kg according to JIS K7210.

2) Flexural modulus:

Measured according to ISO R178-1974 Procedure 12 (JIS K7203), by use of Instron tester. Incidentally, the value of flexural modulus at 80° C. was obtained by carrying out the measurement after placing a thermostatic chamber so as to place the test piece, and a supporting base and a pressure wedge portion to be used for measuring in a warm air thermostatic chamber and controlling the state in an atmosphere at 80° C.±1° C. for 20 minutes.

3) Izod impact strength:

Measured according to ISO $R^{180}$-1969 (JIS K710) notched Izod impact strength, by use of Izod impact tester manufactured by Toyo Seiki Seisakusho.

(3) Heat-resisting aging property:

After treating the test piece in a geer oven manufactured by Toyo Seiki Seisakusho K.K. at 120° C. for 50 hours, Izod impact strength was measured and retaining ratio to the impact strength before heat treatment was calculated.

(4) Melt viscosity:

Shear rate dependency of the melt viscosity at a temperature of 280° C. was measured by an Instron capillary rheometer and calculated the viscosity at a shear rate of 100 $sec^{-1}$.

(5) Measurement of particle diameter:

A part of the test piece evaluated various physical properties was cut out and after dyeing with $OsO_4$ and $RuO_4$, an ultrathin piece was prepared and dispersed form was observed by using a transmission type electron microscope with a magnification of 20,000-fold. By the above dyeing method, the block copolymer of Component (c) in the resin composition was selectively dyed, and as the result, existing state can be confirmed as a black image in the photograph. Using an image analyzing device (SPICCA II manufactured by Nippon Abionics), a diameter $d_1$ corresponding to a circule equal in area was measured with respect to each dispersion particle of Component (c). In a sample having a big particle with an average particle diameter exceeding 1 micron, the same calculation was carried out by making observation magnification 5,000-fold. An average particle diameter was obtained by the following formula from the above $d_1$.

$$D = \Sigma n_i d_i^4 / \Sigma n_i d_i^3$$

wherein ni is a number of particles having a diameter of di corresponding to a circle.

TABLE 1

| | Examples | | | | | |
|---|---|---|---|---|---|---|
| | 1 | 2 | 3 | 4 | 5 | 6 |
| Compounding ratio (parts by weight) | | | | | | |
| Component (a) Polyamide-6 | 48 | 57 | 50 | 48 | 48 | 48 |
| Component (b) Polyphenylene ether | | | | | | |
| Inherent viscosity 0.51 | 39 | 30 | — | — | 39 | 39 |
| Inherent viscosity 0.40 | — | — | 41 | 39 | — | — |
| Inherent viscosity 0.32 | — | — | — | — | — | — |
| Component (c) Block copolymer | SEBS1650 | SEBS1651 | SEBS1651 | SEBS1652 | H*SBS1 Note) | GX1701 |
| | 13 | 13 | 9 | 13 | 13 | 13 |
| Component (d) Maleic anhydride | 0.7 | 0.7 | 0.7 | 0.7 | 0.7 | 0.7 |
| Physical properties | | | | | | |
| MFR (g/10 min) | 21.4 | 30.0 | 23.0 | 27.4 | 27.9 | 34.0 |
| Flexural modulus (kg/cm²) | | | | | | |
| 23° C. | 17300 | 19200 | 20700 | 16400 | 19200 | 17400 |
| 80° C. | 7000 | 7200 | 8300 | 6500 | 7500 | 7700 |
| Izod impact strength (kgcm/cm²) 23° C. | 54.5 | 71.6 | 52.0 | 42.4 | 60.0 | 62.6 |
| Heat-resisting aging property (%) | 86 | 88 | 82 | 88 | 78 | 91 |
| Melt viscosity ratio | 0.3 | 1.0 | 1.4 | 0.1 | 0.6 | 0.1 |
| Component (c) dispersion particle size (μm) | 1.8 | 0.2 | 0.3 | 1.5 | 0.5 | 0.4 |

| | Comparative example | | | | |
|---|---|---|---|---|---|
| | 1 | 2 | 3 | 4 | 5 |
| Compounding ratio (parts by weight) | | | | | |
| Component (a) Polyamide-6 | 48 | 57 | 48 | 46 | 48 |
| Component (b) Polyphenylene ether | | | | | |
| Inherent viscosity 0.51 | 39 | 30 | — | 37 | 39 |
| Inherent viscosity 0.40 | — | — | — | — | — |
| Inherent viscosity 0.32 | — | — | 39 | — | — |
| Component (c) Block copolymer | SEBS1652 | SEBS1726 | SEBS1651 | H*SBS2 Note) | SBS KX65 |
| | 13 | 13 | 13 | 17 | 13 |
| Component (d) Maleic anhydride | 0.7 | 0.7 | 0.7 | 0.7 | 0.7 |
| Physical properties | | | | | |
| MFR (g/10 min) | 26.7 | 30.1 | 38.6 | 16.1 | 29.7 |
| Flexural modulus (kg/cm²) | | | | | |
| 23° C. | 14000 | 12300 | 14800 | 21200 | 16900 |
| 80° C. | 4700 | 3700 | 5000 | 10200 | 6800 |

TABLE 1-continued

| | | | | | |
|---|---|---|---|---|---|
| Izod impact strength (kgcm/cm²) 23° C. | 13.0 | 6.1 | 22.2 | 30.2 | 57.7 |
| Heat-resisting aging property (%) | 84 | —** | —** | 90 | 26 |
| Melt viscosity ratio | 0.06 | 0.005 | 12 | 0.2 | 1.0 |
| Component (c) dispersion particle size (μm) | Not dispersed in polyphenylene ether | | 5 | 0.05 | 0.6 |

Note)
H*SBS1 experimental hydrogenated styrene-butadiene-styrene copolymer styrene content = 40% by weight
H*SBS2 experimental hydrogenated styrene-butadiene-styrene copolymer styrene content = 60% by weight
**Not evaluated.

COMPARATIVE EXAMPLES 6 to 7

Resin compositions were prepared in the same manner as in Example 3 except for using no maleic anhydride (Comparative example 6) or using trimellitic anhydride in place of maleic anhydride (Comparative example 7), and physical properties of the resin composition were evaluated. The results are shown in Table 2.

TABLE 2

| | Comparative example | |
|---|---|---|
| | 6 | 7 |
| MFR (g/10 min) | 16.8 | 25.2 |
| Flexural modulus (kg/cm²) | | |
| 23° C. | 20500 | 19800 |
| 80° C. | 8900 | 8000 |
| Izod impact resistance 23° C. (kg · cm/cm²) | 4.0 | 20.6 |
| Dispersed particle size of Component (c) (μm) | 0.3 | 0.3 |

COMPARATIVE EXAMPLE 8

A resin composition was prepared in the same manner as in Example 1 except for replacing the polyphenylene ether resin with a resin having an inherent viscosity of 0.61 d/g (poly-2,6-dimethyl-1,4-phenylene ether, produced experimentally by Mitsubishi Petrochemistry Co., Ltd.), and physical properties of the resin composition were evaluated. The melt viscosity ratio of this composition was $\eta_c/\eta_b=0.06$. Whereas the secondary dispersion particle size of the block copolymer of this resin composition was 2.3 microns, it can be admitted that a part of the block copolymer was localized at an interface between the polyamide phase (continuous phase) and the polyphenylene ether phase (primary dispersion phase). Flexural modulus at 80° C. of the resin composition was only 5600 kg/cm² and Izod impact strength was 35.3 kg·cm/cm², whereby it can be understood that control of the dispersion state of the block copolymer is required.

EXAMPLES 7 to 9

Resin compositions were prepared in the same manner as in Examples 1, 3 and 4 except for replacing the kneading method with the successive feeding method, and physical properties thereof were evaluated. Using a TEX-30 Model twin screw extruder manufactured by Nippon Seikosho K.K., from a first inlet portion, a mixture mixing and stirring predetermined formulating amounts of the polyphenylene ether resin, the block copolymer and maleic anhydride, and 10% by weight of the predetermined amount of the polyamide resin with a super mixer was supplied. Then, remaining amounts of the polyamide resin were supplied from the second inlet portion. Operation conditions of the extruder were rotating number of 350 rpm, a setting temperature at the region of the first inlet portion of 280° C. and a setting temperature at the region of the second inlet portion of 265° C. Resin compositions corresponding to Examples 1, 3 and 4 are called as Examples 7, 8 and 9, respectively and the evaluated results are shown in Table 3.

COMPARATIVE EXAMPLE 9

A resin composition was prepared in the same manner as in Comparative example 8 except for replacing the kneading method with the above successive feeding method used in Examples 7 to 9, and the same evaluation tests as in Comparative example 8 were carried out. The results are also shown in Table 3.

TABLE 3

| | Examples | | | Comparative example 9 |
|---|---|---|---|---|
| | 7 | 8 | 9 | |
| MFR (g/10 min) | 19.9 | 20.6 | 28.0 | 20.3 |
| Flexural modulus (kg/cm²) | | | | |
| 23° C. | 17300 | 19600 | 17500 | 16500 |
| 80° C. | 7800 | 7100 | 6600 | 5400 |
| Izod impact resistance 23° C. (kg · cm/cm²) | 66.5 | 71.1 | 44.9 | 42.0 |
| Dispersed particle size of Component (c) (μm) | 1.0 | 0.1 | 0.1 | 2.5* |

*partially existed at an interface.

As can be seen from the above results, it can be understood that the successive feeding method is more effective to improve impact strength.

We claim:
1. A resin composition comprising:
   (a) 28 to 78% by weight of a polyamide resin,
   (b) 20 to 70% by weight of a polyphenylene ether resin,
   (c) 2 to 40% by weight of a block copolymer composed of an alkenyl aromatic polymer and a conjugated diene polymer wherein a content of an alkenyl aromatic polymer structure unit is 10 to 45% by weight and at least 50% of a conjugated diene polymer structure unit is hydrogenated and
   (d) at least one compound selected from the group consisting of α, β-unsaturated dicarboxylic acid, an acid anhydride and derivatives thereof with an amount of 0.01 to 10 parts by weight based on 100 parts by weight of the sum of Components (a), (b) and (c),
Component (b) being present in Component (a) as a primary dispersed phase, Component (c) forming a secondary dispersed phase in Component (b), an average particle size of Component (c) being in the range of 0.01 to 3 microns and a melt viscosity ratio ($\eta_c/\eta_b$) of Component (c) and Component (b) being in the range of 0.09 to 5.

2. The resin composition according to claim 1, wherein said composition comprises 35 to 75% by weight of Component (a), 20 to 60% by weight of Component (b), 5 to 35% by weight Component (c), and 0.05 to 5 parts by weight of Component (d) based on 100 parts by weight of Components (a), (b) and (c).

3. The resin composition according to claim 1, wherein said composition comprises 40 to 70% by weight of Component (a), 25 to 50% by weight of Component (b), 7 to 30% by weight Component (c), and 0.2 to 2 parts by weight of Component (d) based on 100 parts by weight of Components (a), (b) and (c).

4. The resin composition according to claim 1, wherein a melt viscosity ratio ($\eta_c/\eta_b$) of Component (c) to Component (b) is in the range of 0.3 to 3.0.

5. The resin composition according to claim 1, wherein Component (d) is at least one of maleic anhydride and maleic acid.

6. The resin composition according to claim 1, wherein said composition is obtained by melting and kneading Components (b), (c) and (d), or Components (b), (c), (d) and a part of Component (a) and then kneading the remaining Component (a).

7. The resin composition according to claim 1, wherein said composition is obtained by melting and kneading Components (b), (c), (d), and 5 to 20% by weight of Component (a) based on total amount to be formulated and then kneading the remaining Component (a).

* * * * *